("US 10,276,167 B2")

(12) United States Patent
Chen et al.

(10) Patent No.: US 10,276,167 B2
(45) Date of Patent: Apr. 30, 2019

(54) METHOD, APPARATUS AND SYSTEM FOR SPEAKER VERIFICATION

(71) Applicant: BEIJING DIDI INFINITY TECHNOLOGY AND DEVELOPMENT CO., LTD., Beijing (CN)

(72) Inventors: Jie Chen, Beijing (CN); Dan Su, Beijing (CN); Tianxiao Fu, Beijing (CN); Na Hu, Beijing (CN)

(73) Assignee: BEIJING DIDI INFINITY TECHNOLOGY AND DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 15/873,410

(22) Filed: Jan. 17, 2018

(65) Prior Publication Data
US 2018/0358020 A1 Dec. 13, 2018

Related U.S. Application Data

(63) Continuation of application No. PCT/CN2017/088073, filed on Jun. 13, 2017.

(51) Int. Cl.
*G10L 15/00* (2013.01)
*G10L 17/00* (2013.01)
*G10L 15/02* (2006.01)
*G10L 17/18* (2013.01)
*G10L 17/16* (2013.01)

(52) U.S. Cl.
CPC ......... *G10L 17/005* (2013.01); *G10L 15/02* (2013.01); *G10L 17/16* (2013.01); *G10L 17/18* (2013.01)

(58) Field of Classification Search
CPC ................................ G10L 17/00; G10L 17/02
USPC ........................................................ 704/246
See application file for complete search history.

(56) References Cited

U.S. PATENT DOCUMENTS

| 7,164,771 | B1* | 1/2007 | Treurniet | G10L 25/69 |
| | | | | 381/56 |
| 8,160,877 | B1 | 4/2012 | Nucci et al. | |
| 2003/0112265 | A1* | 6/2003 | Zhang | G06F 17/30787 |
| | | | | 715/723 |

(Continued)

FOREIGN PATENT DOCUMENTS

| CN | 101419799 A | 4/2009 |
| CN | 101640043 A | 2/2010 |
| EP | 0424071 A2 | 4/1991 |

OTHER PUBLICATIONS

International Search Report in PCT/CN2017/088073 dated Sep. 29, 2017, 4 pages.

(Continued)

*Primary Examiner* — Daniel Abebe
(74) *Attorney, Agent, or Firm* — Finnegan, Henderson, Farabow, Garrett & Dunner, LLP

(57) ABSTRACT

The present disclosure relates to a method, apparatus, and system for speaker verification. The method includes: acquiring an audio recording; extracting speech signals from the audio recording; extracting features of the extracted speech signals; and determining whether the extracted speech signals represent speech by a predetermined speaker based on the extracted features and a speaker model trained with reference voice data of the predetermined speaker.

18 Claims, 7 Drawing Sheets

(56) References Cited

U.S. PATENT DOCUMENTS

| | | | | |
|---|---|---|---|---|
| 2006/0111904 A1* | 5/2006 | Wasserblat | ............... | G10L 17/00 704/246 |
| 2008/0195387 A1 | 4/2008 | Zigel et al. | | |
| 2008/0249774 A1* | 10/2008 | Kim | ................. | G10L 17/02 704/250 |
| 2012/0155663 A1* | 6/2012 | Weinberg | ............ | H04M 3/2281 381/59 |
| 2012/0271632 A1* | 10/2012 | Do | ..................... | G10L 17/02 704/246 |
| 2014/0214676 A1* | 7/2014 | Bukai | .................... | G06Q 20/12 705/44 |
| 2015/0340027 A1 | 11/2015 | Wang | | |
| 2017/0084295 A1 | 3/2017 | Tsiartas et al. | | |

OTHER PUBLICATIONS

Written Opinion of the International Searching Authority in PCT/CN2017/088073 dated Sep. 29, 2017, 4 pages.

The partial supplementary European search report in Europen Application No. 17829582.0 dated Sep. 19, 2018, 13 pages.

Frédéric Bimbot et al., A tutorial on text-independent speaker verification, EURASIP Journal on Applied Signal Processing, 4: pp. 430-451 (2004).

Ruohua Zhou et al., A new time-frequency representation for music signal analysis: Resonator time-frequency image, International Symposium on Signal Processing and Its Applications, 9: 4 pages(2007).

Extended Search Report for European Application No. 17829582.0 from the European Patent Office, dated Jan. 30, 2019.

Examination Report for Australian Application No. 2017305006 from the Australian Government, dated Dec. 11, 2018.

Laskowski, K., et al., *Modeling Instantaneous Intonation for Speaker Identification Using the Fundamental Frequency Variation Spectrum*, ICASSP, pp. 4541-4544, 2009.

Fierrez-Aguilar, J., et al., Speaker Verification Using Adapted User-Dependent Multilevel Fusion, Springer-Verlag Berlin Heidelberg, pp. 356-365, 2005.

He, J., et al., *A Text-Independent Speaker Identification System Based on Neural Networks*, ICSLP (Yokohama), pp. 1851-1854, dated Sep. 18, 1994.

* cited by examiner

METHOD, APPARATUS AND SYSTEM FOR SPEAKER VERIFICATION

CROSS-REFERENCE TO RELATED APPLICATIONS

This application is a continuation of International Application No. PCT/CN2017/088073, filed on Jun. 13, 2017, which designates the United States of America, the contents of which are hereby incorporated by reference to their entirety.

TECHNICAL FIELD

The present disclosure relates generally to speaker verification technology, and more particularly, to methods, systems and apparatuses for reliable and efficient speaker verification.

BACKGROUND

Speaker verification technology involves verifying a speaker based on the characteristics of his or her voice, or voiceprints. Such characteristics may relate to the speaker's anatomic features, such as the size and shape of his or her larynx, mouth and nose, and behavioral patterns, such as voice pitch, and language. Speaker verification technologies generally fall into two categories: text-dependent speaker verification, and text-independent verification. Various speaker verification techniques have been developed and applied to verify the identification of a speaker, particularly as a security mechanism.

Many services and products are now offered and processed through remote communication between a user terminal and a service provider server. For example, it has been increasingly popular for passengers to book a cab service through an application on their mobile terminals. The information may then be transmitted through the Internet to a cab service management system, which may process the trip information, locate an available driver registered in the system, and arrange a pick-up accordingly. However, there are situations where the registered driver accounts are improperly used by unauthorized users, causing security concerns and problems in driver record management. For example, a registered driver may share his or her account with other drivers without authorization, or a driver account or driver's mobile terminal may be hacked or stolen. Such unauthorized usages of a driver account not only cause revenue loss of the provider, but also raise safety concerns about inability of tracking real identity of the drivers. Reliable systems for verifying the driver's identification are therefore needed to improve security of cab services, and efficient management of driver record.

In view of the above problems, this disclosure provides speaker verification methods, devices, and systems for improved security for applications such as cab hailing, and efficient management of registered user accounts.

SUMMARY

One aspect of the present disclosure is directed to a speaker-verification method. The method may include: acquiring an audio recording; extracting speech signals from the audio recording; extracting features of the extracted speech signals; and determining whether the extracted speech signals represent speech by a predetermined speaker based on the extracted features and a speaker model trained with reference voice data of the predetermined speaker.

Another aspect of the present disclosure is directed to a speaker verification system. The system may include a memory including instructions and a processor configured to execute the instructions to: receive an audio recording; extract speech signals from the audio recording; extract features of the extracted speech signals; and determine whether the extracted speech signals represent speech by a predetermined speaker based on the extracted features and a speaker model trained with reference voice data of the predetermined speaker.

Another aspect of the present disclosure is directed to a non-transitory computer-readable storage medium storing instructions that, when executed by one or more processors, cause the processors to perform a speaker verification method. The method includes: acquiring an audio recording; extracting speech signals from the audio recording; extracting features of the extracted speech signals; and determining whether the extracted speech signals represent speech by a predetermined speaker based on the extracted features and a speaker model trained with reference voice data of the predetermined speaker.

Another aspect of the present disclosure is directed to a speaker verification method. The method may include: acquiring a plurality of audio recordings from a terminal; extracting speech signals from the plurality of audio recordings; extracting features of the extracted speech signals; classifying the extracted features into one or more classes; and when the extracted features are classified into more than one class, determining the plurality of audio recordings includes speeches by one or more speakers different from a predetermined speaker.

Another aspect of the present disclosure is directed to a speaker verification system. The system may include a memory including instructions and a processor configured to execute the instructions to: receive a plurality of audio recordings from a terminal; extracting speech signals from the plurality of audio recordings; extract features of the extracted speech signals; classify the extracted features into one or more classes; and when the extracted features are classified into more than one class, determine the plurality of audio recordings includes speeches by one or more speakers different from a predetermined speaker.

Yet another aspect of the present disclosure is directed to a non-transitory computer-readable storage medium storing instructions that, when executed by one or more processors, cause the processors to perform a speaker verification method. The method includes: acquiring a plurality of audio recordings from a terminal; extracting speech signals from the plurality of audio recordings; extracting features of the extracted speech signals; classifying the extracted features into one or more classes; and when the extracted features are classified into more than one class, determining the plurality of audio recordings includes speeches by one or more speakers different from a predetermined speaker.

DETAILED DESCRIPTION

This disclosure generally relates to verifying a speaker based on the voice characteristics extracted from the speaker's voice data. Voice data may be obtained from audio recording input including the speaker's speech signals, such as a voice recording of a speaker reading certain texts, or a recording of a conversation between the speaker and another person. It may be obtained in real time, or through input of pre-stored recordings. Further, different user terminals may be used for receiving an audio recording input, for example, PDAs, tablets, computers such as laptops, mobile phones, smart watches, etc.

In connection with transportation service, for example, a transportation service provider (e.g., a provider of cab hailing, private car hailing, ride sharing, etc.) may use the voice data to verify the identity of a driver or passenger. Specifically, passengers needing transportation service, e.g., cab service, may have a cab service application installed on their user terminals, such as their mobile phones. Drivers providing cab service may also have corresponding applications installed on their terminals, for receiving orders, and/or receiving instructions from the transportation service provider to process an order and pick up a certain passenger. In a typical scenario, a passenger may input information about an upcoming trip through a driver-side mobile phone application, and request cab service. The transportation service provider may receive such service request through a network, process the order accordingly, and dispatch an available driver to arrange pick-up. Before passenger pick-up, a driver may contact the passenger according to the passenger's contact information, such as a phone number or other account information associating with the passenger. The communication may involve a direct conversation between the driver terminal and the passenger terminal. To facilitate management and ensure security of the cab service, the conversation may be recorded, and the audio recording may be provided to a verification system for further processing and speaker verification, for example, to verify the identity of the driver according to the registered driver information.

Figure 1:
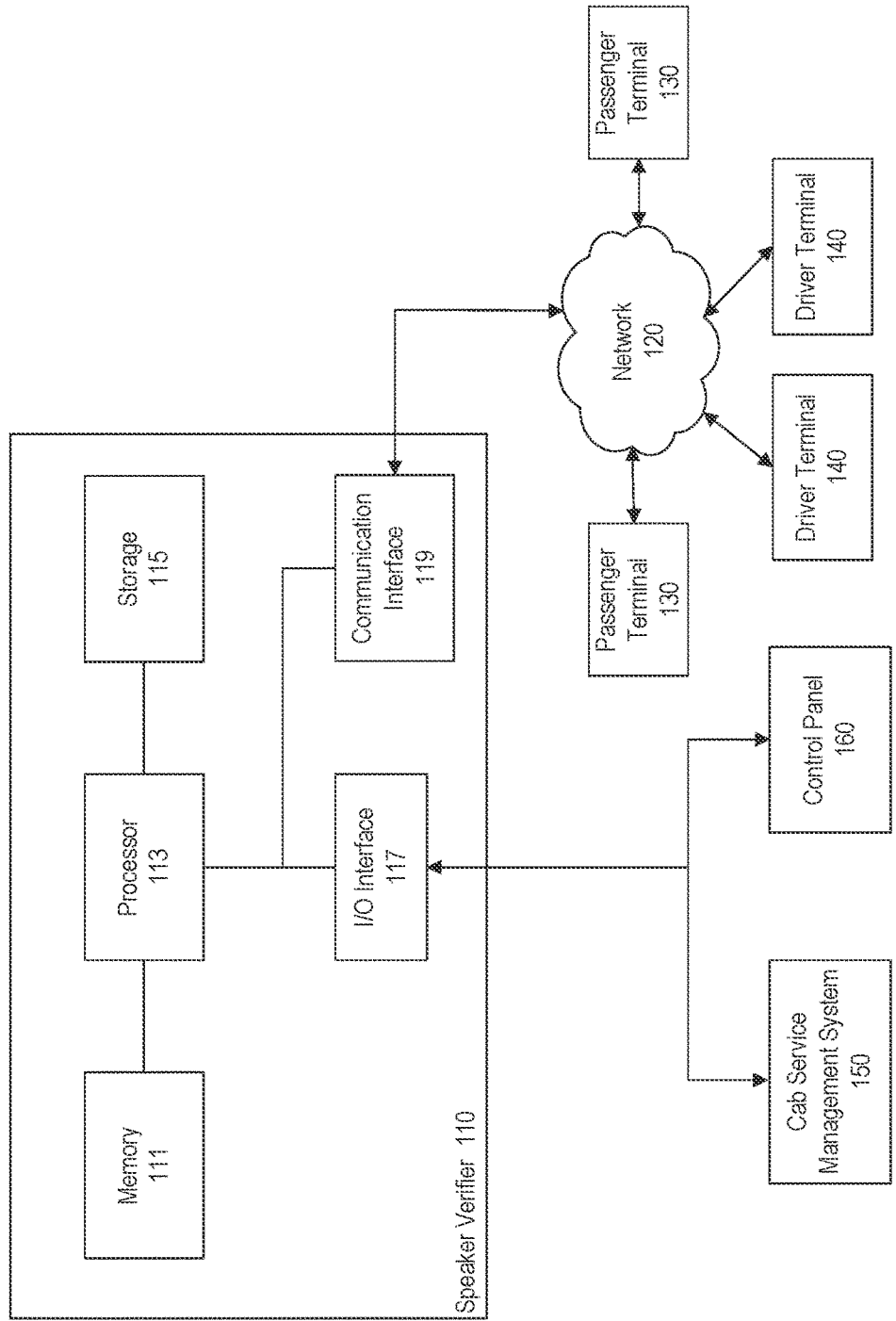
FIG. 1 is a block diagram of a speaker verification system 100 used in cab service management area according to an exemplary embodiment.

FIG. 1 is a block diagram of a speaker verification system 100 used in cab service management according to an exemplary embodiment. Referring to FIG. 1, system 100 may include a speaker verifier 110, a network 120, a plurality of passenger terminals 130, and a plurality of driver terminals 140, a cab service management system 150, and a control panel 160.

Speaker verifier 110 may be configured to verify a speaker according to the voice characteristics of a speaker. As shown in FIG. 1, speaker verifier 110 may include, among other things, a memory 111, a processor 113, a storage 115, an input/output (I/O) interface 117, and a communication interface 119. At least some of these components of speaker verifier 110 may be configured to transfer data, and send or receive instructions between or among each other. In some embodiments, speaker verifier 110 may be installed as part of a cab service management platform operated by the transportation service provider, or its functions may also be embodied as part of a cab service application (e.g., an application installed on passenger terminal 130), enabling a user to verify the identity of the driver providing the service.

Processor 113 may include any appropriate type of general-purpose or special purpose microprocessor, digital signal processor, or microcontroller. Processor 113 may be configured as a separate processor module dedicated to verifying a speaker and outputting result of the verification. Alternatively, processor 113 may be configured as a shared processor module for performing other functions unrelated to speaker verification.

Processor 113 may be configured to receive data and/or signals from other components of system 110 to perform speaker verification. For example, processor 113 may exchange information with cab service management system 150 and instructions from control panel 160 via, for example, I/O interface 117. After verification, processor 113 may provide the verification result to the cab service management system 150 and control panel 160, which may provide further instructions such as storing the verification results, updating the driver/user account record, or outputting the verification result to a corresponding passenger terminal 130 or a corresponding driver terminal 140.

Processor 113 may also access information transmitted through communication interface 119. For example, processor 113 may receive an audio recording of a conversation including audio signals from a passenger terminal 130 and a driver terminal 140, transmitted through network 120. After verification, processor 113 may, upon receiving instructions from the control panel 160, transmitting the verification result to the corresponding passenger terminal 130 and the corresponding driver terminal 140 via network 120.

Processor 113 may execute computer instructions (e.g., program codes) stored in memory 111 and/or storage 115, and may perform functions in accordance with exemplary techniques described in this disclosure. More exemplary functions of processor 113 will be described later in relation to FIGS. 2-7.

Memory 111 and storage 115 may include any appropriate type of mass storage provided to store any type of information that processor 113 may need to operate. Memory 111 and storage 115 may be manifested in a volatile or non-volatile, magnetic, semiconductor, tape, optical, removable, non-removable, or other type of storage device or tangible (i.e., non-transitory) computer-readable medium including, but not limited to, a read-only memory (ROM), a flash memory, a dynamic random-access memory (RAM), and a static RAM. Memory 111 and/or storage 115 may be configured to store one or more computer programs that may be executed by processor 113 to perform the disclosed methods described herein for speaker verification.

Memory 111 and/or storage 115 may be further configured to store information and data used by processor 113. For example, memory 111 and/or storage 115 may store the audio recordings received from passenger terminals 130 and/or driver terminals 140, data generated during the speaker verification process, and the ultimate verification result.

I/O interface 117 may be configured to facilitate the communication between speaker verifier 110, cab service management system 150, and control panel 160. For example, speaker verifier 110 may provide the speaker verification result to cab service management system 150 via I/O interface 117, for updating the driver account information, and cab service record. Speaker verifier 110 may also receive instructions from control panel 160 regarding performance of speaker verification, or for further outputting the verification result to the corresponding passenger terminal 130 and driver terminal 140.

Communication interface 119 may be configured to communicate with passenger terminals 130 and driver terminals 140 via network 120. Network 120 may be any type of wired or wireless network that may allow transmitting and receiving data. For example, network 120 may be a wired network, a local wireless network (e.g., Bluetooth™, WiFi, near field communications (NFC), etc.), a cellular network, an Internet, or the like, or a combination thereof. Other known communication methods which provide a medium for transmitting data are also contemplated.

Passenger terminal 130 may be any device capable of receiving and transmitting information through network 120, for example, a mobile phone, a computer such as laptop or desktop, PDAs, tablets, smart watches, etc., which carry a cab service application. It may be configured to receive and record audio signals and transmit information through network 120. For example, a passenger may input information through an application on a mobile phone, initiate or participate in a conversation with a driver terminal 140. The passenger's mobile phone functions as a passenger terminal 130 that receives an audio recording of the conversation, which may then be transmitted to speaker verifier 110 for speaker verification.

Driver terminal 140 may be any device capable of receiving and transmitting information through network 120, similar to passenger terminal 130. For example, driver terminal 140 may be a mobile phone, a computer such as laptop or desktop, PDAs, tablets, smart watches, etc., which carry a cab service application. It may also be a device or module installed as part of a vehicle control system. For example, a driver may input information through an application on a mobile phone, initiate or participate in a conversation with a passenger terminal 130. The driver's mobile phone functions as a driver terminal 140 that receives an audio recording of the conversation, which may then be transmitted to speaker verifier 110 for speaker verification. Further, during driver account registration, driver terminal 140 may be configured to receive the driver's registration or account setting information, such as phone number, gender, email account, and voice recordings. Driver terminal 140 may then transmit the driver registration information via network 120 to speaker verifier 110.

Passenger terminal 130 and/or driver terminal 140 may further include a display including an LCD, an LED, a plasma display, or any other type of display, and provide a Graphical User Interface (GUI) presented on the display for user input and data display. For example, user and driver account information may be displayed through the display, and the speaker verification result may also be displayed.

Cab service management system 150 may further include a plurality of components for managing driver accounts record, and cab service delivery. It may communicate with speaker verifier 110 via I/O interface 117, to transmit driver account information, and receive verification result from speaker verifier 110, etc. It may further include other components such as a database storing driver record associated with speaker verification results, a processor for evaluating driver performance based on the driver record, and the processor may further be configured to dispatch an available driver by sending an order notification to the corresponding driver terminal 140.

Although shown as separate modules in FIG. 1, it is contemplated that speaker verifier 110, cab service management system 150, and control panel 160 may also be integrated as one system. For example, in one embodiment, speaker verifier 110 and control panel 160 may integrated in cab service management system 150, which is operated by the transportation service provider. Other components of system 100 and their functions not directly related to speaker verification are not described in detail herein.

Figure 2:
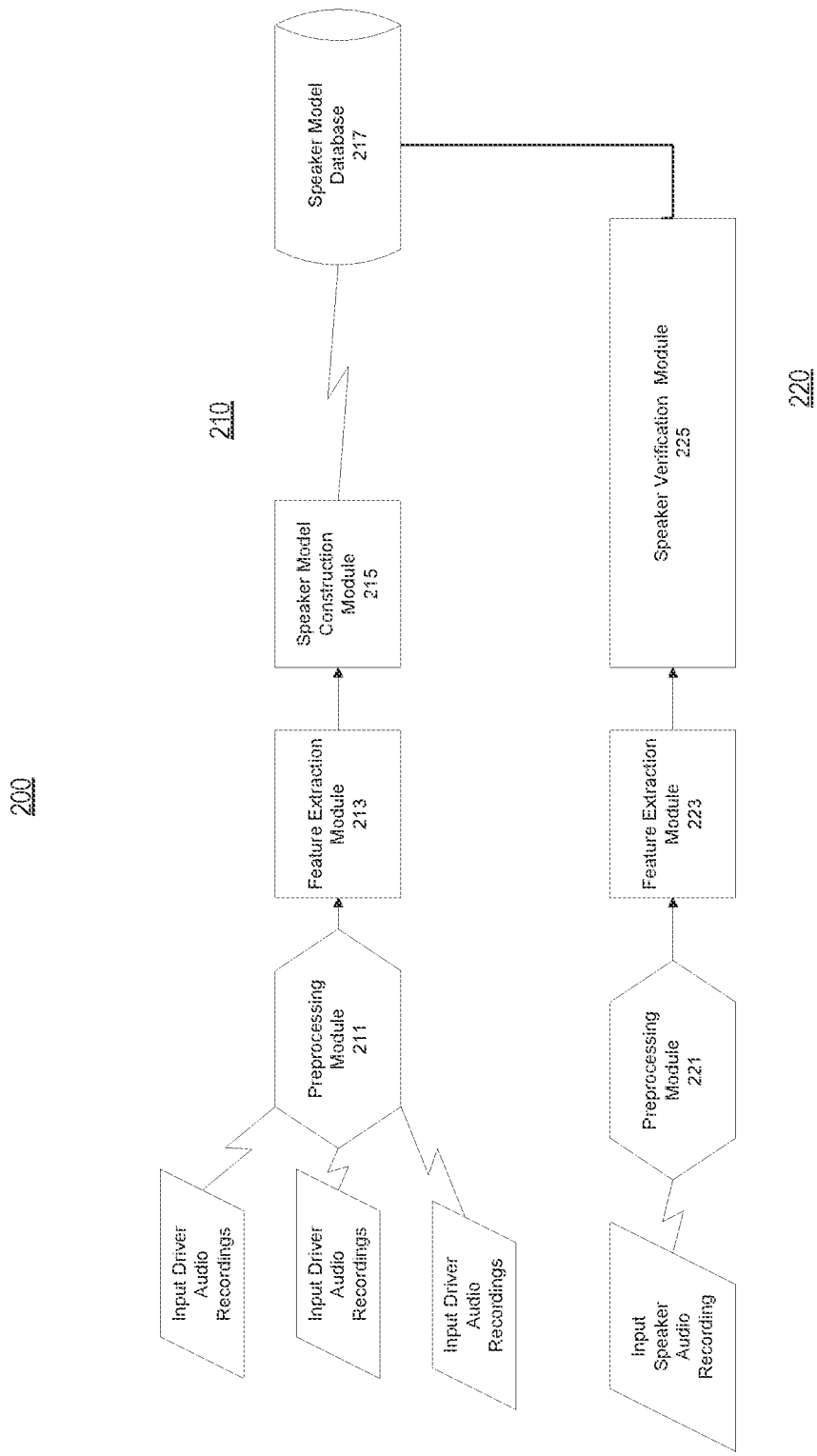
FIG. 2 is a block diagram of a speaker verifier 200, according to an exemplary embodiment applied in cab service management area.

FIG. 2 is a block diagram of a speaker verifier 200, according to an exemplary embodiment applied in cab service management area. Referring to FIG. 2, speaker verifier 200 may include a driver registration section 210, and a driver verification section 220. Driver registration section 210 may further include a preprocessing module 211, a feature extraction module 213, a speaker model construction module 215, and a speaker model database 217. Driver verification section 220 may further include a preprocessing module 221, a feature extraction module 223, and a speaker verification module 225. Preprocessing modules 211 and 221 may be embodied in the same functional module, performing preprocessing functions in both a driver registration process and a driver verification process. Similarly, feature extraction modules 213 and 223 may also be embodied in the same functional module, performing feature extraction functions for both the driver registration process and driver verification process.

During driver registration, preprocessing module 211 is configured to preprocess the received driver audio recordings transmitted from driver terminal 140. The preprocessing steps include extracting speech signals, removing ambient noise or background noise signals, and extracting driver voice data, for further processing by voice feature extraction module 213. Preprocessing of the audio recordings may further include selecting the voice data corresponding to a speaker consistent with the gender associated with the driver, if speech signals corresponding to more than one gender are present. Details of the preprocessing steps will be further described below with reference to FIGS. 3 and 4.

Feature extraction module 213 is configured to extract voice features from the pre-processed voice data. Various existing feature extraction techniques used in speech or speaker verification technologies may be used. For example, feature extraction module 213 may be configured to extract Mel Frequency Cepstral Coefficients (MFCCs), which was introduced by Davis and Mermelstein in the 1980s and widely used in speech recognition, others may include Linear Prediction Coefficients (LPCs), or Linear Prediction Cepstral Coefficients (LPCCs).

Speaker model construction module 215 may be configured to utilize the features extracted by the feature extraction module 213, and construct a speaker acoustic model representing the voice features of the driver being registered. Various speaker model construction techniques may be used by speaker model construction module 215. For example, Deep Neural Networks (DNNs) may be trained using the features extracted from driver voice data, and a speaker model may be constructed by extracting a feature vector representing the voice features of the speaker. A DNN is an artificial neural network (ANN) with multiple hidden layers between the input and output layers. Other speaker models that may be utilized include Gaussian Mixture Model (GMM), or a Hidden Markov Model (HMM) model. There are also combinations of different approaches for training speaker models. This present disclosure is not limited to any particular model training approach.

After registering in the cab service system, a driver will have a speaker model trained with his unique voice features. All speaker models may be stored in speaker model database 217, which means every registered driver will have a speaker model associated with his account. The speaker models will then be used in the driver verification process.

Driver verification section 220 includes preprocessing module 221, feature extraction module 223, and speaker verification module 225, which verifies a speaker based on the speaker models saved in speaker model database 217.

Preprocessing module 221 may be configured to preprocess an audio recording input, which may be in the form of an audio recording of a conversation between a driver and a passenger. Similar to the preprocessing steps performed by preprocessing module 211 during driver registration, preprocessing during verification may include selecting signals transmitted from driver terminal 140, extracting speech signals, removing ambient noise or background noise signals, and extracting driver voice data, for further processing by voice feature extraction module 223. Preprocessing of the audio recordings may further include selecting the voice data corresponding to a speaker consistent with the gender associated with the corresponding registered driver, if speech signals corresponding to more than one gender are present. Details of the preprocessing will be further described below with reference to FIGS. 3 and 4.

Feature extraction module 223 is configured to extract voice features from the pre-processed speaker voice data. Various existing feature extraction techniques used in speech or speaker recognition technologies may be used by feature extraction module 223. For example, feature extraction module 223 may be configured to extract Mel Frequency Cepstral Coefficients (MFCCs) features, which was introduced by Davis and Mermelstein in the 1980s and widely used in speech recognition, others may include Linear Prediction Coefficients (LPCs), or Linear Prediction Cepstral Coefficients (LPCCs).

Speaker verification module 225 may be configured to verify whether the speaker is the registered driver, based on the extracted speaker voice features and the speaker model associated with the registered driver. The verification may include checking the extracted features against the speaker model corresponding to the registered driver, and calculating a similarity score. The similarity score will be compared with a predetermined similarity threshold. Details of the verification process are further described below with reference to FIG. 5.

Figure 3:
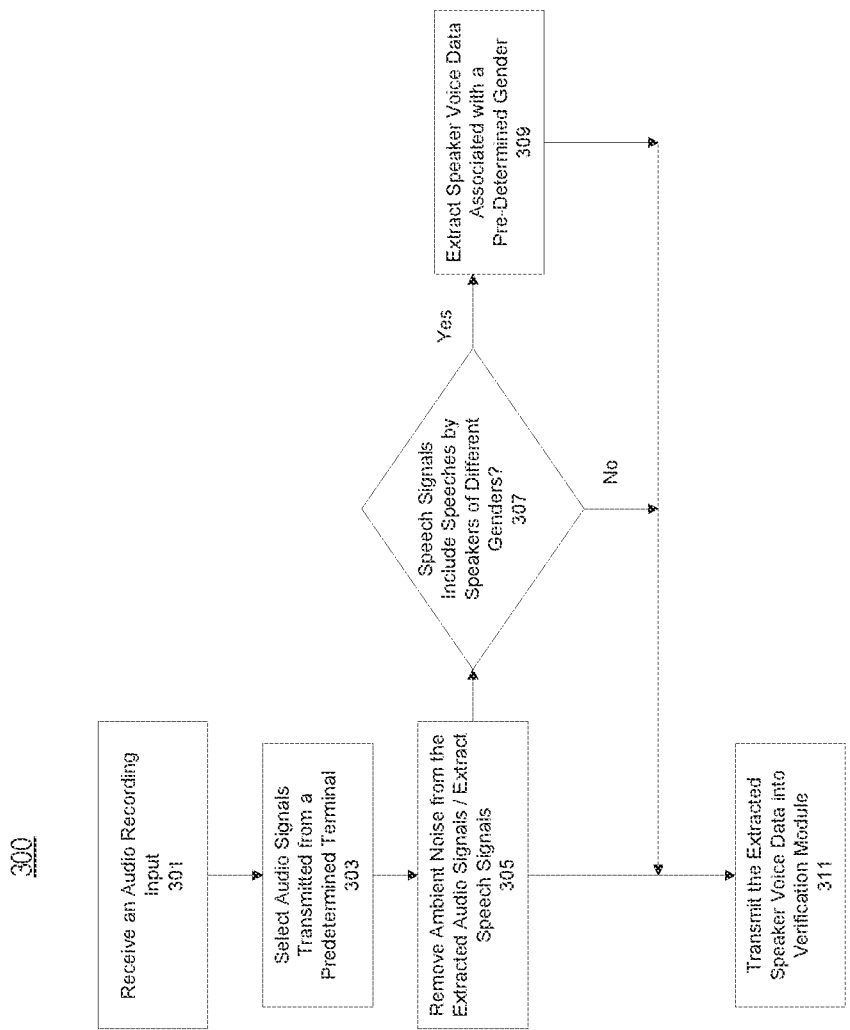
FIG. 3 is a flowchart illustrating an audio-signal preprocessing method 300, according to an exemplary embodiment.

FIG. 3 is a flowchart illustrating an audio-signal preprocessing method 300, according to an exemplary embodiment. Method 300 may be performed by a preprocessing module of a speaker verification device, such as preprocessing module 211 and/or 221 shown in FIG. 2. As an example, method 300 illustrated here are related to the preprocessing during speaker/driver verification used in cab service context. As noted above, similar preprocessing steps may be performed during user/driver registration process.

Step 301, preprocessing module 221 receives an audio recording input, which includes a conversation between a passenger and a driver. The audio recording may be transmitted from one or both of passenger terminal 130 and driver terminal 140 through a network, as shown in FIG. 1.

Step 303, preprocessing module 221 selects audio signals transmitted from a predetermined terminal. This may be performed by selecting the audio signals transmitted from driver terminal 140 associated with the account being used. When a registered account is being used, preprocessing module 221 may check the terminal information associated with the account, and audio signals transmitted from the corresponding terminal may be selected accordingly. For example, this may also be performed based on the channel information of the transmitted audio signals from driver terminal 140 and passenger terminal 130.

Step 305, preprocessing module 221 removes ambient noise from the extracted audio signals, or extracting speech signals. The selected audio signals from the predetermined driver terminal 140 may include various background or environment noise, such as sounds from other media players, sounds from other terminals nearby, noise generated by operation of the vehicle, and noise from the environment outside of the vehicle. Such ambient noise may be removed, and the speech signals may be extracted. This may be performed by various existing techniques, such as classifying different sound signals according to their frequencies, and removing signals corresponding to non-speech frequencies. In some embodiments, this may also be performed using Resonator Time-Frequency Image (RTFI) spectrum, by producing a time-frequency energy spectrum, and selecting the speech signals based on their energy levels. For example, preprocessing module 221 may perform RTFI analysis on the extracted audio signals to obtain a time-frequency energy spectrum, which is then averaged across a time domain to obtain an average energy spectrum. Preprocessing module 221 may then use energy-change based segmentation methods to determine the starting points and endings points of speech signals and non-speech signals. Non-speech signal components and background noise components of the input audio signal may then be removed, based on their energy levels different from those of speech signals.

Step 307, preprocessing module 221 determines whether the speech signals include speeches by multiple speakers of different genders. For example, the speech signals transmitted from a driver terminal 140 may include the speech from the driver, and also utterance of another person nearby, such as a passenger in the vehicle who may be of a different gender. Speech signals from speakers of different genders may be classified based on the difference in the characteristic fundamental frequencies of different genders. Fundamental frequency represents the frequency of vocal cord vibration and correlates with changes in the vocal cord tension, the size and thickness of vocal cord, and subglottal air pressure. Fundamental frequency varies with factors such as gender and age. It correlates with pitch, and shows how high or low a person's voice sounds. For example, a typical adult male has a fundamental frequency ranging from 85 to 180 Hz, while a typical adult female has a fundamental frequency ranging from 165 to 255 Hz. Many algorithms have been developed to estimate the fundamental frequency of an audio signal, such as the widely-used YIN algorithm, and modifications of YIN, such as Probabilistic YIN (PYIN) algorithm.

Step 309, if it is determined that the speech signals include speeches by multiple speakers of different genders, preprocessing module 221 extracts voice data associated with a predetermined gender associating with the driver account. The speech signals from a speaker of a gender different from the one associated with the driver account may be removed. For example, if the gender associated with the driver account is male, and the extracted speech signals includes speech signals from a female passenger, which may be determined based on the characteristic fundamental frequencies corresponding to a female, the speech signals from the female passenger may be removed.

Step 311, preprocessing module 221 transmits the extracted speaker voice data into feature extraction module 223 for further processing.

Figure 4:
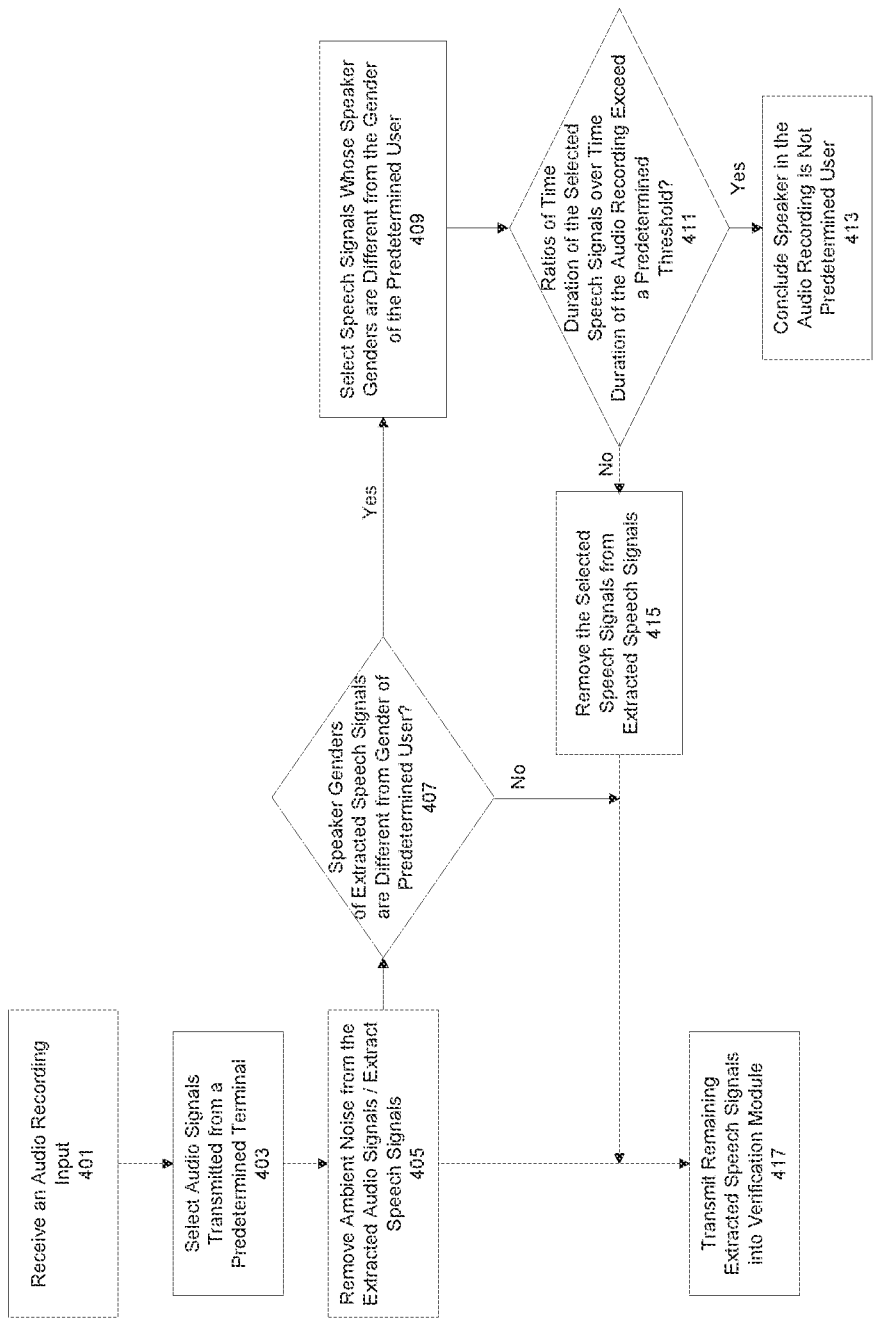
FIG. 4 is a flowchart illustrating an audio-signal preprocessing method 400, according to another exemplary embodiment.

FIG. 4 is a flowchart illustrating an audio-signal preprocessing method 400, according to another exemplary embodiment. Similar to method 300, method 400 may be related to the preprocessing during speaker/driver registration or verification processes used in cab service context. For example, method 400 may be performed by a preprocessing module of a speaker verification device, such as preprocessing module 211 and/or 221 shown in FIG. 2. For illustrative purpose only, method 400 will be described as being performed by preprocessing module 221 in a speaker verification process.

Referring to FIG. 4, steps 401-405 are similar to steps 301-305, details of which are not repeated herein. Next, in step 407, preprocessing module 221 determines the speaker genders of the extracted speech signals. For example, as described above in connection with step 307, preprocessing module 221 may determine the speaker genders based on fundamental frequencies of the speech signals. When it is determined that the speech signals represent (i.e., the audio recording includes) speeches by speakers whose genders are different from the gender of a predetermined user, such as the driver of a vehicle, preprocessing module 221 proceeds to step 409 and selects the speech signals whose speaker genders are different from the gender of the predetermined user.

In step 411, preprocessing module 221 computes a ratio of the time duration of a selected speech signal over the time duration of the audio recording, to determine whether the speech represented by the selected speech signal represents a significant portion of the audio recording. If the ratio exceeds a predetermined threshold, preprocessing module 221 directly concludes the speaker in the audio recording is not the predetermined user (step 413). If, however, the ratio is equal to or below the predetermined threshold, preprocessing module 221 removes the selected speech signal from the extracted speech signals (step 415), and then returns to step 411 to check the ratio for next selected speech signal. In step 417, preprocessing module 221 transmits the remaining extracted speech signals into feature extraction module 223 for further processing (step 417).

According to method 400, during the preprocessing phase of the audio recording, the speaker verification device identifies speech signals whose speaker genders do not match the gender of the predetermined user. If one or more of the identified speech signals constitute a significant portion of the audio recording, the speaker verification device concludes the speaker in the audio recording is not the predetermined user, without the need to further process the audio recording. Otherwise, the speaker verification device filters the identified speech signals from the audio recording, to reduce the amount of data that needs further processing. This way, the accuracy of speaker verification is improved while the computation cost is reduced.

Figure 5:
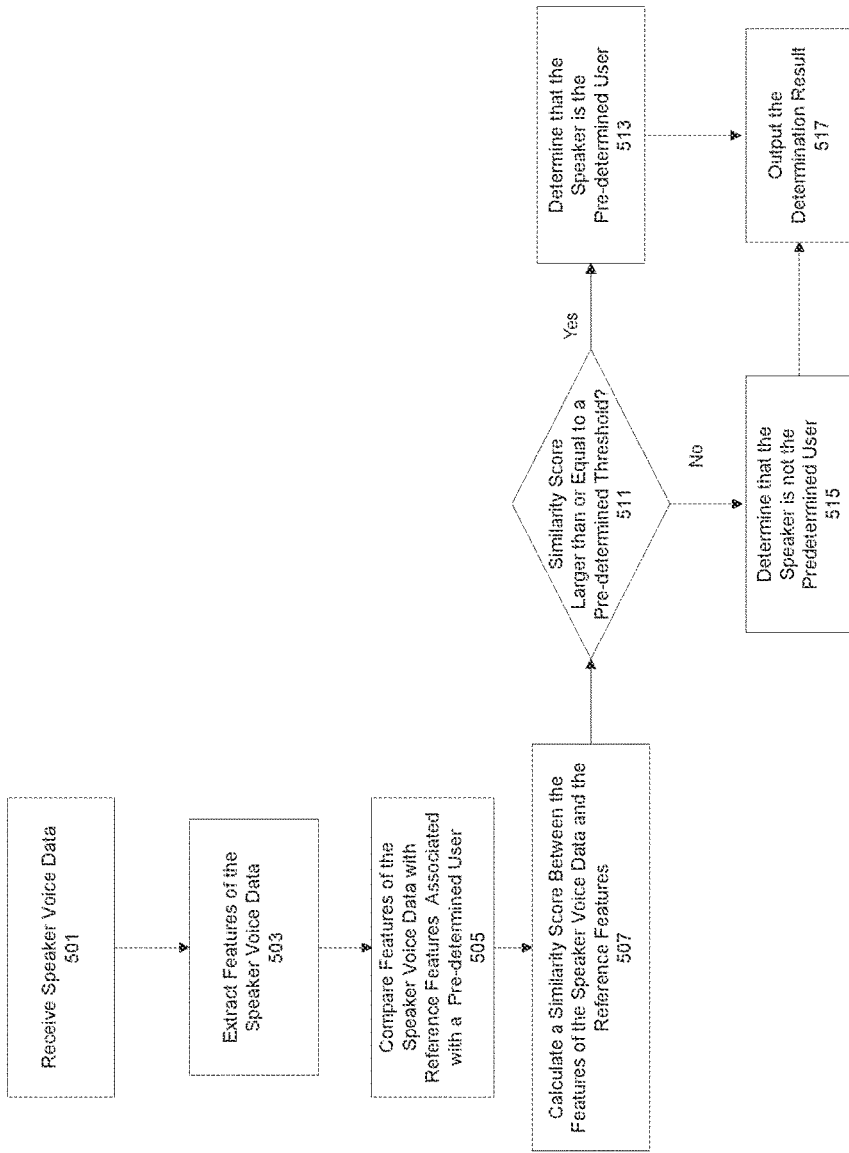
FIG. 5 is a flowchart illustrating a speaker verification process 500, according to an exemplary embodiment.

FIG. 5 is a flowchart illustrating a speaker verification process 500, according to an exemplary embodiment. This may be performed by driver verification section 220 of speaker verifier 200 shown in FIG. 2. For example, in a cab service management context, speaker verification method 500 of this embodiment may be used to verify whether the speaker is the registered driver.

Step 501, feature extraction module 223 receives speaker voice data transmitted from preprocessing module 221.

Step 503, feature extraction module 223 extracts features of the speaker voice data. As described above, various existing feature extraction techniques used in speech or speaker recognition technologies may be used. For example, feature extraction module may be configured to extract Mel Frequency Cepstral Coefficients (MFCCs) features, which was introduced by Davis and Mermelstein in the 1980s and widely used in speech recognition, others may include Linear Prediction Coefficients (LPCs), or Linear Prediction Cepstral Coefficients (LPCCs).

Next, steps 505-517 illustrate the process of verifying whether the speaker is the same as the registered driver based on the extracted features of the speaker voice data, and a speaker model corresponding to the registered driver. These steps may be performed by speaker verification module 225. Further, speaker models of all registered drivers may be constructed based on the voice features of the respective drivers, and saved during driver registration, the process of which is further illustrated below with reference to FIG. 6.

Step 505, speaker verification module 225 compares features of the speaker voice data with reference features associated with a predetermined user. In cab service context, the predetermined user corresponds to the register driver, whose speaker model has been constructed and stored in a speaker model database during driver registration. The reference features correspond to the features of the registered driver.

Step 507, speaker verification module 225 calculates a similarity score measuring similarity between the features of the speaker voice data and the reference features of the registered driver. A similarity score may be calculated by checking the features of the speaker voice data against the speaker model corresponding to the registered driver. The similarity score represents the degree of similarity between the features of the speaker voice data and the reference features of the registered driver. For example, a feature vector representing the features of the speaker voice data may be generated and compared with the feature vector representing the features associated with the registered driver.

In some embodiments, a feature vector representing the features associated with the registered driver may be obtained after training a DNN with a plurality of audio recordings of the registered driver, and taking an averaging feature vector based on the feature vectors of the plurality of audio recordings. The similarity score may be obtained by calculating the difference between the feature vector obtained from the speaker voice data, and the averaging feature vector corresponding to the registered driver. Further, in some embodiments, probabilistic linear discriminant analysis (PLDA) scoring may be used for the similarity score calculation.

Step 511, speaker verification module 225 compares the similarity score with a predetermined threshold. The calculated similarity score will then be compared with a predetermined threshold. The predetermined threshold represents the minimum standard when the verification is successful. For example, if the similarity value is manifested as a distance between the feature vector of the speaker voice data, and the feature vector corresponding to the registered driver, the calculated distance in step 507 will be compared with a predetermined threshold distance. In practical applications, the threshold may be manifested in other ways or as other values, and may vary depending on the system requirements.

Step 513, if the similarity score satisfies the predetermined threshold, speaker verification module 225 concludes the speaker is the register driver, i.e., the verification is successful.

Step 515, if the similarity score does not satisfy the predetermined threshold, speaker verification module 225 concludes the speaker is not the register driver, i.e., the verification is not successful.

Step 517, speaker verification module 225 outputs the determination result. As noted above, taking the system described in FIG. 1 as an example, the determination result may be output to the cab service management system 150 via I/O interface 117, to update the cab service record, or driver account record. It may also be output to the control panel 160, which may then send instructions requesting the determination result to be provided to a corresponding passenger terminal 130 or driver terminal 140, via network 120.

Figure 6:
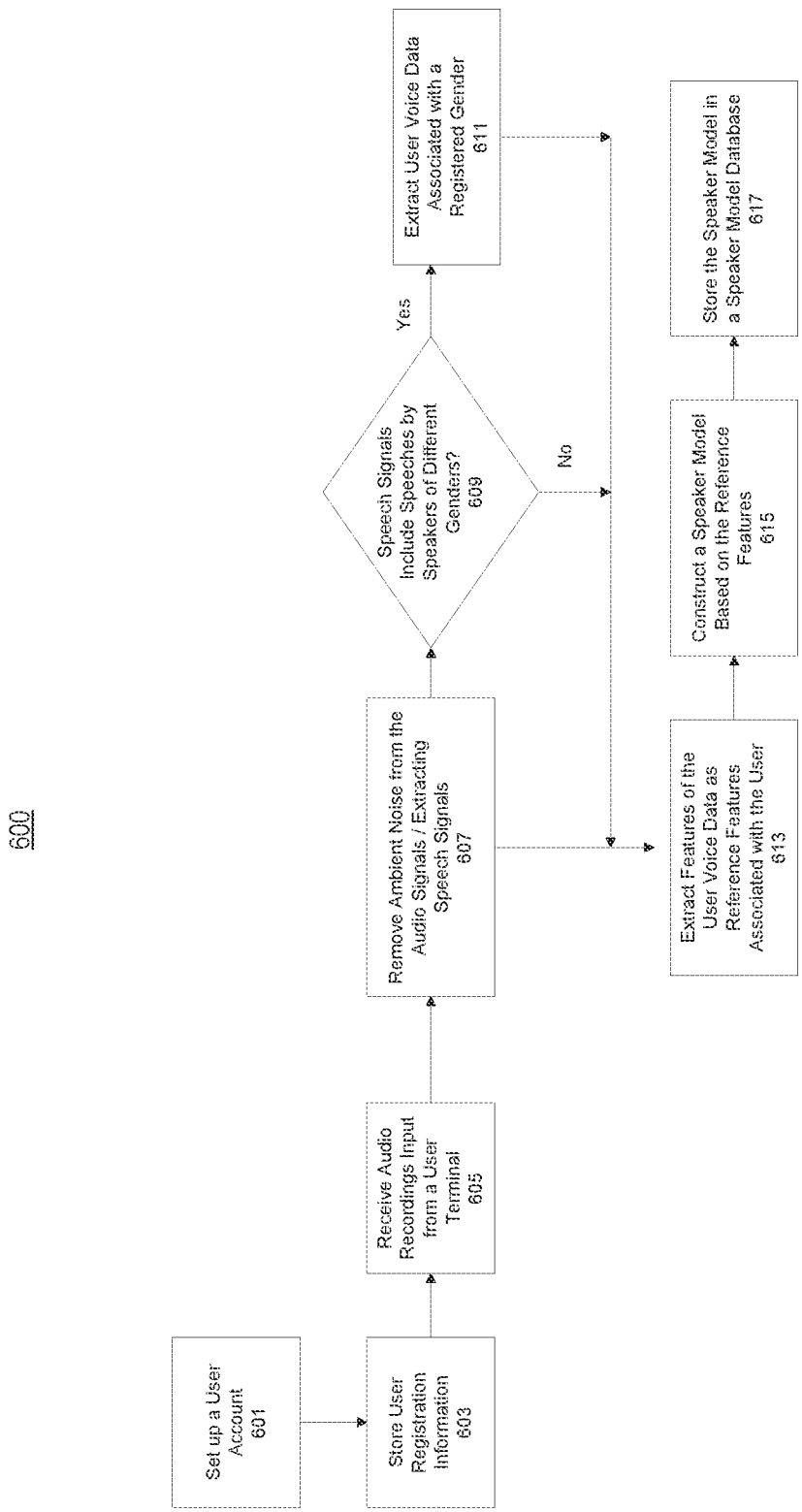
FIG. 6 is a flowchart illustrating a speaker enrollment or registration process 600, according to an exemplary embodiment.

FIG. 6 is a flowchart illustrating a speaker enrollment or registration process 600, according to an exemplary embodiment. In cab service context, process 600 represents a process where a new driver account is registered and stored, and a driver speaker model may be constructed and stored for future verification purposes. For example, process 600 may be performed by driver registration section 210 of speaker verifier 200 shown in FIG. 2.

Step 601, a driver sets up a user account with cab service management system 150. A driver may register a new user account through a driver terminal application. The driver terminal application may then transmit required registration information to a cab service management system, such as cab service management system 150, which processes the registration request and set up a user account for the driver.

Step 603, cab service management system 150 stores user registration information. When a new driver account is set up, the driver registration information may be stored, including information associated with the corresponding driver terminal 140, the driver's personal information such as gender, age, driving experience, license information, and contact information such as the driver's phone number, or other account information associated with the driver.

Step 605, preprocessing module 211 receives audio recording input from a user terminal, such as a driver terminal 140. The newly registered driver may be requested to input one or more his or her audio recordings, this may be in the form of reading certain designated texts, or random speech utterances. As shown in FIG. 1, the audio recordings from driver terminal 140 may then be transmitted through network 120 to preprocessing module 211.

Step 607, preprocessing module 211 removes ambient noise from the audio signals, or extracts speech signals from the audio signals. Audio recordings input into a driver terminal 140 may include background noise, or non-speech related sounds. Theses sounds may be removed from the audio signals before feature extraction. In the disclosed embodiments, step 507 is similar to step 305, details of which are not repeated herein.

Step 609, preprocessing module 211 determines if the speech signals include speeches by speakers of different genders. This step may be optional, depending on the audio recording input quality and purity. Similar to step 307 described in connection with FIG. 3, whether the speech signals include speeches by speaker of different genders may be determined, for example, based on the different characteristics fundamental frequencies corresponding to different genders.

Step 611, preprocessing module 211 extracts user voice data associated with the gender that is previously registered. During step 603, the gender information of the newly registered driver has been input and stored. If speeches by speakers of different genders are present in the speech signals, the speech signals corresponding to the registered gender may be extracted for further processing. In the disclosed embodiments, step 611 is similar to step 309 described in connection with FIG. 3, details of which are not repeated herein.

Step 613, feature extraction module 213 extracts features from the received user voice data into the feature extraction module. This include steps similar to the feature extraction process described with reference to FIG. 5, details of which are not repeated herein.

Step 615, speaker model construction module 215 constructs a speaker model based on the reference features. As described above with reference to FIG. 2, various speaker model construction techniques may be used by speaker model construction module 215. For example, Deep Neural Networks (DNNs) may be trained using the features extracted from driver voice data, and a speaker model may be constructed by extracting a feature vector representing the voice features of the speaker. Other speaker models that may be utilized include Gaussian Mixture Model (GMM) and a Hidden Markov Model (HMM) model. There are also combinations of different approaches for constructing speaker models, the present disclosure is not limited to any particular speaker model construction approach.

Step 617, after constructing a speaker model corresponding to the registered driver, the speaker model may then be stored in speaker model database 217. Every registered driver may have a speaker model constructed and stored for future verification.

In some embodiments, a certain registered driver account may not have a stored speaker model corresponding to the driver. According to one speaker verification embodiment, the speaker verifier may collect a plurality of audio recordings of driver-passenger conversations over a period of time, to determine whether one registered driver account is used by multiple users, as further described below with reference to FIG. 6.

Figure 7:
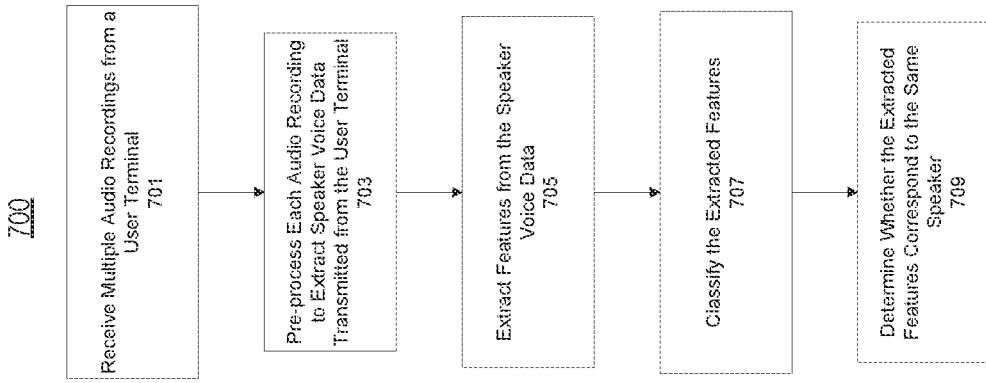
FIG. 7 is a flowchart illustrating a speaker verification method 700 where no speaker model associated with a registered driver account has been stored, according to an exemplary embodiment.

FIG. 7 is a flowchart illustrating a speaker verification method 700 where no speaker model associated with a registered driver account has been stored. For example, method 700 may be performed by system 100.

Step 701, speaker verifier 110 receives multiple audio recordings from a user terminal. For example, when a driver terminal 140 associated with one registered driver account has been used by multiple drivers to provide cab service, speaker verifier 110 may collect multiple recordings over a period of time.

Step 703, speaker verifier 110 pre-processes each audio recording to extract speaker voice data transmitted from driver terminal 140. In the disclosed embodiments, step 603 is similar to methods 300 and/or 400, details of which are not repeated herein.

Step 705, speaker verifier 110 extracts features from the speaker voice data. In the disclosed embodiments, step 705 is similar to step 503 or 613, details of which are not repeated herein.

Step 707, speaker verifier 110 classifies the extracted features. After features from the speaker voice data are extracted with respect to each audio recording input from driver terminal 140, the features are classified to determine if they correspond to the same person. Different feature classifiers may be used in the classification, for example, Naive Bayes classifier, or Support Vector Machine (SVM) classifier. Other classifiers in existing speaker recognition technologies may also be used, and it may be chosen based on the features extracted. Further, the classification may not need to use all the extracted features.

Step 709, speaker verifier 110 determines whether the extracted features correspond to the same speaker. Depending on whether the classification in step 707 shows multiple categories of features, speaker verifier 110 may determine whether there are multiple users using the same driver account. If the features belong to more than one category, then it may be determined that there are multiple users using the same driver account. The determination result may then be output to cab service management system 150 for further actions.

Another aspect of the disclosure is directed to a non-transitory computer-readable medium storing instructions which, when executed, cause one or more processors to perform the speaker verification methods, as discussed above. The computer-readable medium may include volatile or non-volatile, magnetic, semiconductor, tape, optical, removable, non-removable, or other types of computer-readable medium or computer-readable storage devices. For example, the computer-readable medium may be the storage unit or the memory module having the computer instructions stored thereon, as disclosed. In some embodiments, the computer-readable medium may be a disc or a flash drive having the computer instructions stored thereon.

It will be apparent to those skilled in the art that various modifications and variations can be made to the disclosed speaker verification system and related methods. Other embodiments will be apparent to those skilled in the art from consideration of the specification and practice of the disclosed speaker verification system and related methods. For example, although the disclosed speaker verification systems and methods are described in connection with a cab hailing service, they can be adapted and implemented for other applications where a person's identity can be verified based on the voice, such as customer service call centers, food delivery ordering systems, payment systems through phone, etc. It is intended that the specification and examples be considered as exemplary only, with a true scope being indicated by the following claims and their equivalents.

What is claimed is:

1. A method for verifying identify of a speaker through at least one electronic device having logic circuits, at least one storage medium, and a communication platform connected to a network, comprising:
    obtaining, by the logic circuits, an audio recording associated with a target account registered with the at least one electronic device;
    extracting, by the logic circuits, speech signals corresponding to a gender of a predetermined user associated with the target account;
    in response to a determination that the audio recording includes speeches by speakers of different genders, removing, by the logic circuits, speech signals corresponding to a different gender from that of the predetermined user; and
    extracting, by the logic circuits, features of the extracted speech signals; and
    determining, by the logic circuits, whether the extracted speech signals represent a speech by the predetermined user associated with the target account, based on the extracted features and a speaker model trained with reference voice data of the predetermined user.

2. The method of claim 1, wherein the audio recording is transmitted from a terminal associated with the predetermined user or the audio recording is from a telephone call between a driver of a vehicle and a passenger of the same vehicle.

3. The method of claim 1, wherein extracting the speech signals comprises:
    determining, by the logic circuits, energy levels of the audio recording; and
    extracting, by the logic circuits, the speech signals based on the energy levels.

4. The method of claim 3, wherein determining the energy levels of the audio recording comprises:
    determining, by the logic circuits, a Resonator Time-Frequency Image (RTFI) spectrum of the audio recording.

5. The method of claim 1, wherein determining whether the audio recording includes speeches by speakers of different genders comprises:
    detecting, by the logic circuits, whether the audio recording includes characteristic fundamental frequencies of different genders.

6. The method of claim 1, wherein:
    the extracted speech signals include a first speech signal; and
    extracting the speech signals comprises:
    determining, by the logic circuits, a speaker gender of the first speech signal;
    when the speaker gender of the first speech signal is different from a gender of the predetermined user, determining a ratio of a time duration of the first speech signal over a time duration of the audio recording;
    when the ratio exceeds a predetermined threshold, concluding, by the logic circuits, that the audio recording does not include speech by the predetermined user; and
    when the ratio is equal to or below the predetermined threshold, removing, by the logic circuits, the first speech signal from the extracted speech signals.

7. The method of claim 1, wherein the extracted features comprise Mel-Frequency Cepstral Coefficients (MFCCs) of the extracted speech signals.

8. The method of claim 1, wherein determining whether the extracted speech signals represent speech by the predetermined user further comprises:
    extracting, by the logic circuits, reference features associated with the predetermined user from the reference voice data; and
    training, by the logic circuits, the speaker model based on the reference features.

9. The method of claim 8, wherein the speaker model is at least one of a Gaussian Mixture Model (GMM), a Hidden Markov Model (HMM), or a Deep Neural Network (DNN) model.

10. The method of claim 8, further comprising:
    determining, by the logic circuits, a similarity between the extracted features and the reference features; and
    determining, by the logic circuits, whether the extracted speech signals represent speech by the predetermined user based on the similarity.

11. A system for verifying identity of a speaker, comprising:
    logic circuits electronically connected to at least one storage medium via a bus, wherein during operation, the logic circuits read the at least one storage medium and load a set of instructions from the at least one storage medium, and:

obtain electronic signals from the bus, the electronic signals including an audio recording associated with a target account registered with the system;

extract speech signals corresponding to a gender of a predetermined user associated with the target account;

in response to a determination that the audio recording includes speeches by speakers of different genders, remove speech signals corresponding to a different gender from that of the predetermined user; and extract features of the extracted speech signals; and determine whether the extracted speech signals represent speech by the predetermined user associated with the target account based on the extracted features and a speaker model trained with reference voice data of the predetermined user.

12. The system of claim 11, wherein the audio recording is transmitted from a terminal associated with the predetermined user or the audio recording is from a telephone call between a driver of a vehicle and a passenger of the same vehicle.

13. The system of claim 11, wherein the logic circuits further:

determine energy levels of the audio recording; and extract the speech signals based on the energy levels.

14. The system of claim 11, wherein the logic circuits further:

detect whether the audio recording includes characteristic fundamental frequencies of different genders.

15. The system of claim 11, wherein:

the extracted speech signals include a first speech signal; and the logic circuits further:

determine a speaker gender of the first speech signal;

when the speaker gender of the first speech signal is different from a gender of the predetermined user, determine a ratio of a time duration of the first speech signal over a time duration of the audio recording;

when the ratio exceeds a predetermined threshold, conclude that the audio recording does not include speech by the predetermined user; and when the ratio is equal to or below the predetermined threshold, remove the first speech signal from the extracted speech signals.

16. The system of claim 11, wherein the logic circuits further:

extract reference features associated with the predetermined user from the reference voice data; and train the speaker model based on the reference features.

17. The system of claim 16, wherein the speaker model is at least one of a Gaussian Mixture Model (GMM), a Hidden Markov Model (HMM), or a Deep Neural Network (DNN) model.

18. The system of claim 16, wherein the logic circuits further:

determine a similarity between the extracted features and the reference features; and determine whether the extracted speech signals represent speech by the predetermined user based on the similarity.

* * * * *